United States Patent
Ogawa

(10) Patent No.: US 8,579,355 B2
(45) Date of Patent: Nov. 12, 2013

(54) VEHICLE WINDOW SECTION STRUCTURE

(75) Inventor: Yoshitaka Ogawa, Yokohama (JP)

(73) Assignee: Nissan Motor Co., Ltd, Yokohama-shi (JP)

( * ) Notice: Subject to any disclaimer, the term of this patent is extended or adjusted under 35 U.S.C. 154(b) by 0 days.

(21) Appl. No.: 13/702,225

(22) PCT Filed: May 27, 2011

(86) PCT No.: PCT/JP2011/062176
§ 371 (c)(1),
(2), (4) Date: Dec. 5, 2012

(87) PCT Pub. No.: WO2011/155343
PCT Pub. Date: Dec. 15, 2011

(65) Prior Publication Data
US 2013/0076061 A1    Mar. 28, 2013

(30) Foreign Application Priority Data
Jun. 7, 2010  (JP) .................................. 2010-129659

(51) Int. Cl.
*B60J 1/00* (2006.01)
(52) U.S. Cl.
USPC ................. 296/146.9; 296/146.15; 296/96.11
(58) Field of Classification Search
USPC ................. 296/201, 146.9, 146.15, 91, 96.11; 49/502
See application file for complete search history.

(56) References Cited

U.S. PATENT DOCUMENTS

| 4,538,851 | A * | 9/1985 | Taylor ........................ 296/180.1 |
| 6,331,030 | B1 * | 12/2001 | Geiger ........................ 296/146.9 |
| 6,378,931 | B1 * | 4/2002 | Kolluri et al. ............. 296/146.15 |
| 2003/0071482 | A1 * | 4/2003 | Shimizu ..................... 296/146.9 |
| 2006/0156632 | A1 * | 7/2006 | Ruppert et al. ................. 49/502 |
| 2007/0262615 | A1 * | 11/2007 | Koizumi et al. .............. 296/201 |
| 2008/0073939 | A1 * | 3/2008 | Arai et al. ..................... 296/201 |
| 2010/0064592 | A1 | 3/2010 | Ohe |
| 2011/0194201 | A1 * | 8/2011 | Muramatsu ................... 359/871 |
| 2011/0241370 | A1 * | 10/2011 | Alvarez et al. ............... 296/1.08 |
| 2012/0153659 | A1 * | 6/2012 | Senge .............................. 296/93 |
| 2012/0274102 | A1 * | 11/2012 | Ertl ............................... 296/201 |

FOREIGN PATENT DOCUMENTS

| JP | 04-224415 A | 8/1992 |
| JP | 06-025375 Y2 | 7/1994 |
| JP | 2009-096296 A | 5/2009 |
| JP | 2010-105583 A | 5/2010 |

* cited by examiner

*Primary Examiner* — Jason S Morrow
(74) *Attorney, Agent, or Firm* — Foley & Lardner LLP

(57) ABSTRACT

Provided is a vehicle window section structure in which in a state where an openable and closable front door is closed, a gap (63) extending inward in a vehicle width direction is formed between a small window (9) provided on a vehicle body side and a mount body (25) of a door mirror mount provided to the front door. A peripheral member (11) is provided on the outer periphery of the small window (9). A lip (50) extending along the vehicle width direction is provided to the peripheral member (11). Distance between the lip (50) and the mount body (25) facing the lip (50) is larger toward an outer end in the vehicle width direction and smaller toward an inner end in the vehicle width direction.

4 Claims, 7 Drawing Sheets

VEHICLE WINDOW SECTION STRUCTURE

TECHNICAL FIELD

The present invention relates to a vehicle window section structure.

BACKGROUND ART

Heretofore, there have been known vehicles in which a small window, or a so-called opera window or quarter window, is arranged in the vicinity of a corner portion between a front portion of a front pillar and the upper surface of a rear end portion of a front fender, as disclosed in Japanese Examined Utility Model Registration Application Publication No. Hei 6(1994)-25375, for example.

SUMMARY OF INVENTION

However, in the window section structure described in Japanese Examined Utility Model Registration Application Publication No. Hei 6-25375 mentioned above, a molding is arranged along the outer periphery of the small window, and with the door closed, a gap is formed between the molding and the sash (window frame) of the door. Thus, traveling wind may possibly enter the gap and generate a wind noise while the vehicle is traveling.

In this respect, the present invention provides a vehicle window section structure capable of efficiently reducing a wind noise generated in the vicinity of a small window.

A vehicle window section structure according to the present invention includes: a small window provided on a vehicle body side; a lip provided on an outer periphery of the small window and extending inward in a vehicle width direction; and a door mirror mount provided to an openable and closable door and disposed facing the lip in a state where the door is closed. A gap extending inward in the vehicle width direction is formed between the lip and the door mirror mount, and, in the gap, distance between the lip and the door mirror mount is large at an outer end in the vehicle width direction and smaller at an inner end in the vehicle width direction than at the outer end in the vehicle width direction.

In the vehicle window section structure according to the present invention, the lip and the door mirror mount disposed facing the lip are formed such that the cross-sectional width therebetween is larger toward the outer end in the vehicle width direction and smaller toward the inner end in the vehicle width direction. Thus, as traveling wind that occurs when the vehicle travels enters the gap between the lip and the door mirror mount, the flow speed of the traveling wind gradually decreases and the pressure thereof increases. Accordingly, it is possible to efficiently reduce the wind noise by the traveling wind.

DESCRIPTION OF EMBODIMENTS

Hereinbelow, an embodiment of the present invention will be described in detail along with the drawings.

Figure 1:
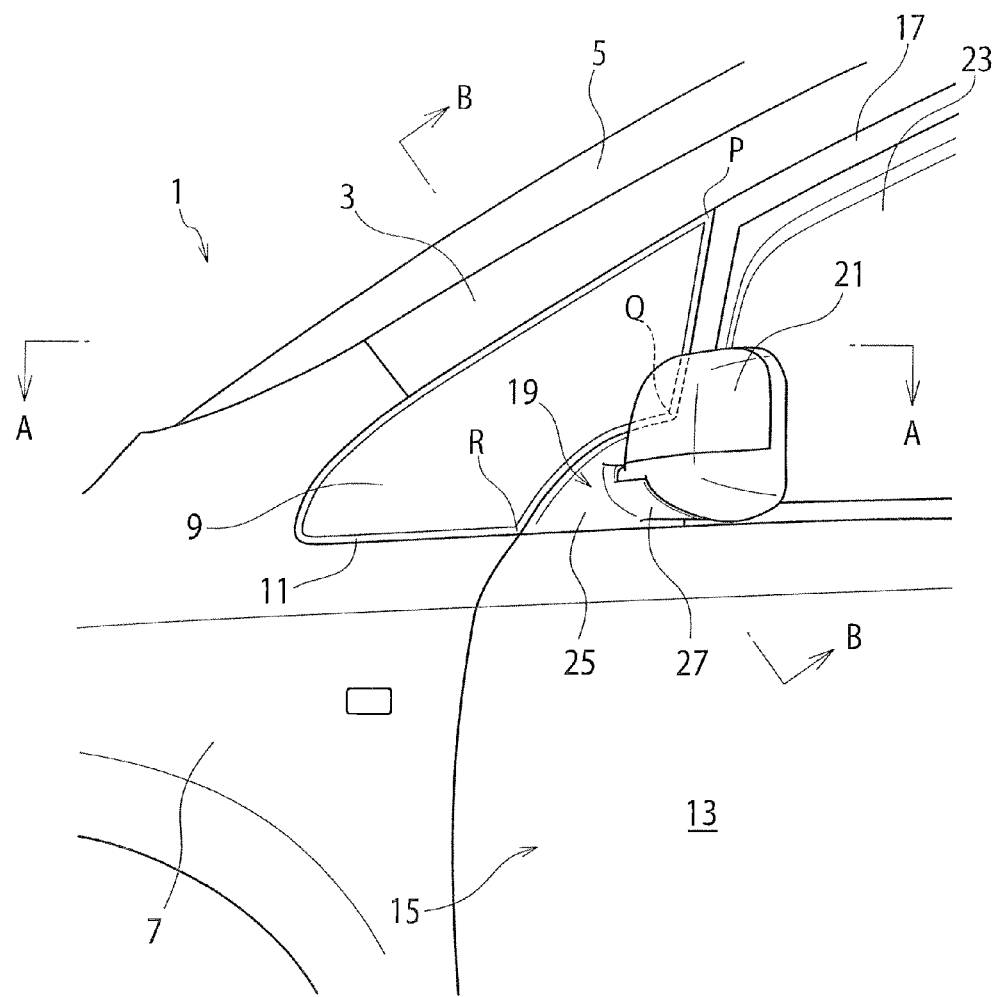
FIG. 1 is a side view of a front section of a vehicle employing a window section structure according an embodiment of the present invention.
Figure 2:
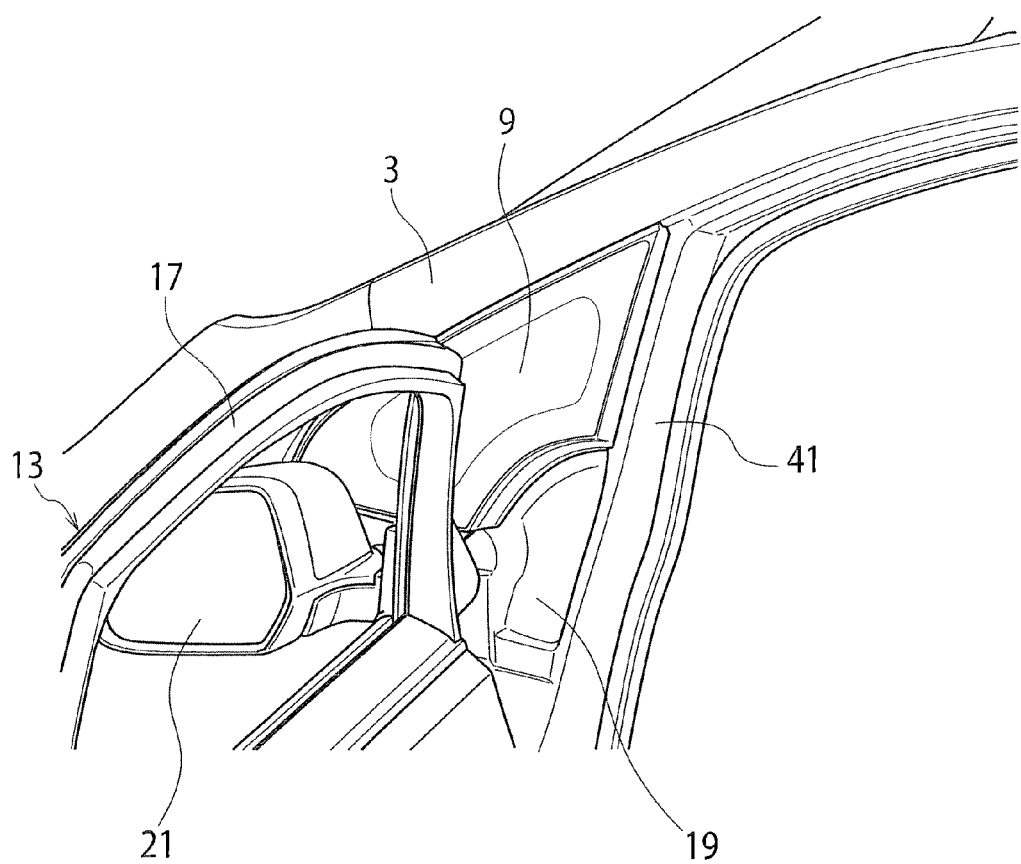
FIG. 2 is a perspective view of a state where a front door in FIG. 1 is opened, as seen obliquely from the rear.

As shown in FIGS. 1 and 2, in a front section of a vehicle 1, a pair of front pillars 3 extending obliquely upward toward the rear of the vehicle are arranged on both left and right sides of the vehicle body. A windshield 5 is arranged along the vehicle width direction between the pair of front pillars 3 and 3.

Moreover, a front fender 7 is arranged below a front side of each front pillar 3. A small window 9 called an opera window is fixed to the vehicle body side at a corner section which is generally triangular in a side view and defined by the front pillar 3 and the front fender 7. Specifically, the small window 9 is mounted to the vehicle body side through a peripheral member 11 arranged along the outer periphery thereof.

Meanwhile, a front door (door) 13 is provided openably and closably on a rear side of the front fender 7 and small window 9 in the vehicle. The front door 13 includes: a door body 15 disposed in a lower portion; a window frame 17 disposed above the door body 15; a door mirror mount 19 provided on a front portion of the door body 15; and a door mirror 21 mounted to the door body 15 through the door mirror mount 19. A door glass 23 is provided in the window frame 17 in such a way as to be capable of being raised and lowered. Note that the door mirror mount 19 is integrally formed of a mount body 25 mounted to the door body 15 and a mirror base 27 projecting from the mount body 25 toward the outer side of the vehicle (outward in the vehicle width direction). The door mirror 21 is supported turnably on the mirror base 27.

Figure 3:
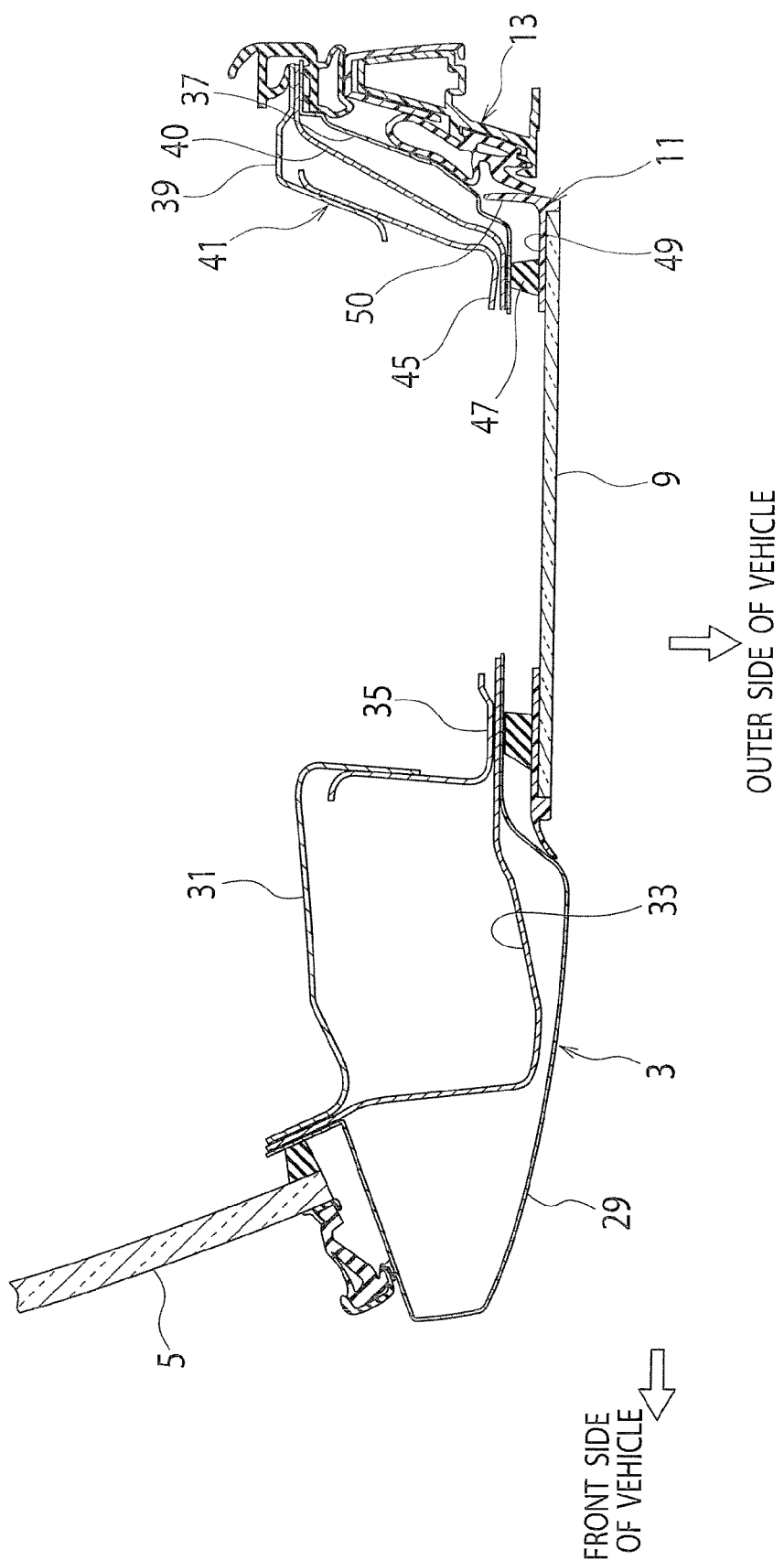
FIG. 3 is a cross-sectional view taken along line A-A in FIG. 1.

As shown in FIG. 3, the front pillar 3 is formed to have a closed sectional structure by an outer panel 29, an inner panel 31, and a reinforcement panel 33. In a rear end portion of the front pillar 3, a flange portion 35 is formed which extends in the vehicle front-rear direction. Moreover, in an area corresponding to a rear end portion of the small window 9, a holding member 41 is arranged which is formed to have a closed sectional structure by an outer panel 37, an inner panel 39, and a reinforcement panel 40. In a front end portion of the holding member 41, a flange portion 45 is formed which extends toward the trout of the vehicle.

In addition, the small window 9 is arranged between the flange portion 35 of the front pillar 3 and the flange portion 45 of the holding member 41. Specifically, the peripheral member 11 is joined to and along the outer periphery of the small window 9. Contact rubber 47 projecting toward the inner side of the vehicle (inward in the vehicle width direction) is provided on the back surface of the peripheral member 11. The contact rubber 47 is bonded to the flange portion 35 of the front pillar 3 and the flange portion 45 of the holding member 41 by means of adhesive.

Moreover, a rear portion of the peripheral member 11 of the small window 9, which extends from a point P through a point Q to a point R as shown in FIG. 1, is integrally formed of a holding surface 49 extending along and bonded to the back surface of the small window 9, a lip 50 extending from the outer periphery of the holding surface 49 toward the inner side of the vehicle, and the contact rubber 47 provided on the holding surface 49, as shown in FIG. 3.

Figure 4:
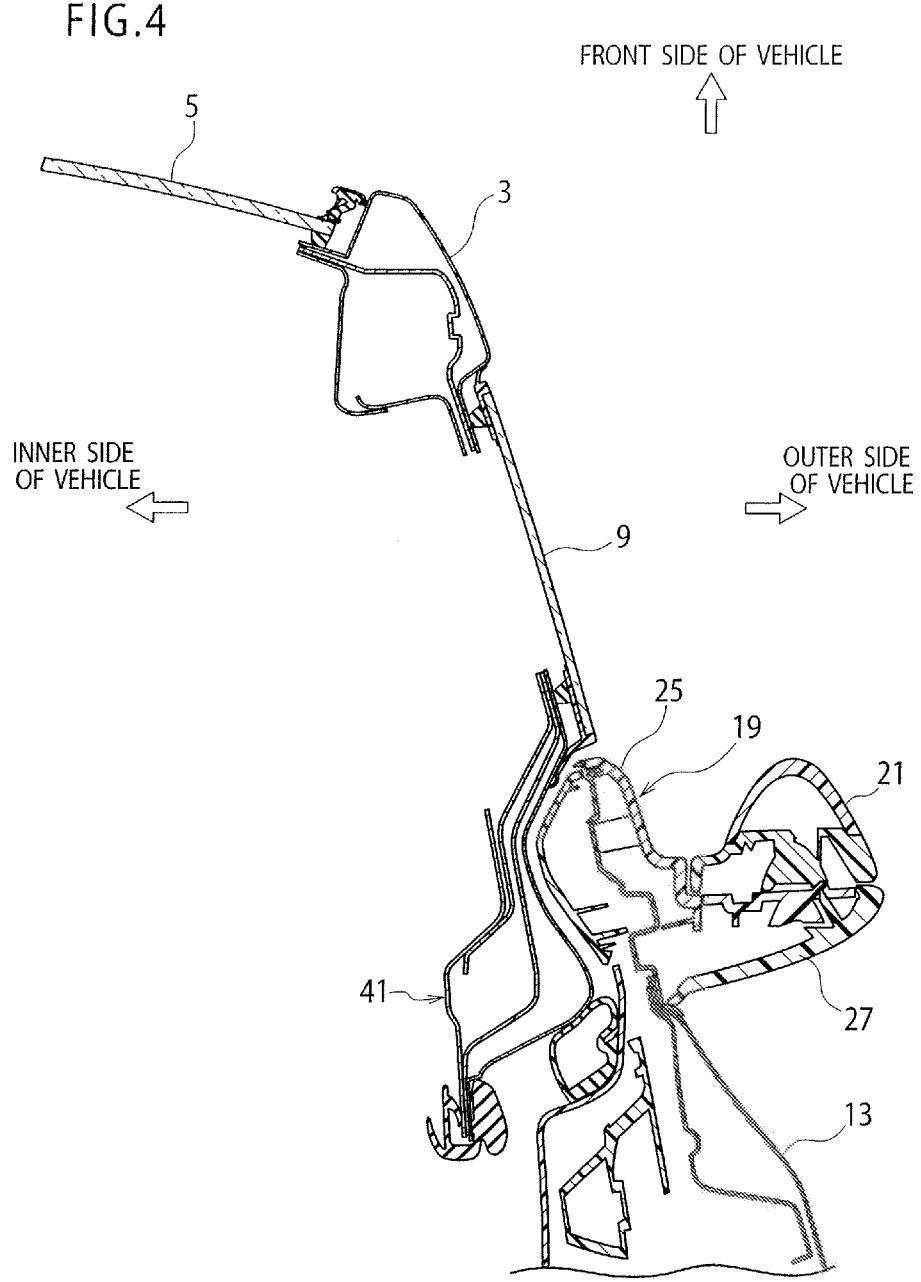
FIG. 4 is a cross-sectional view taken along line B-B in FIG. 1.
Figure 5:
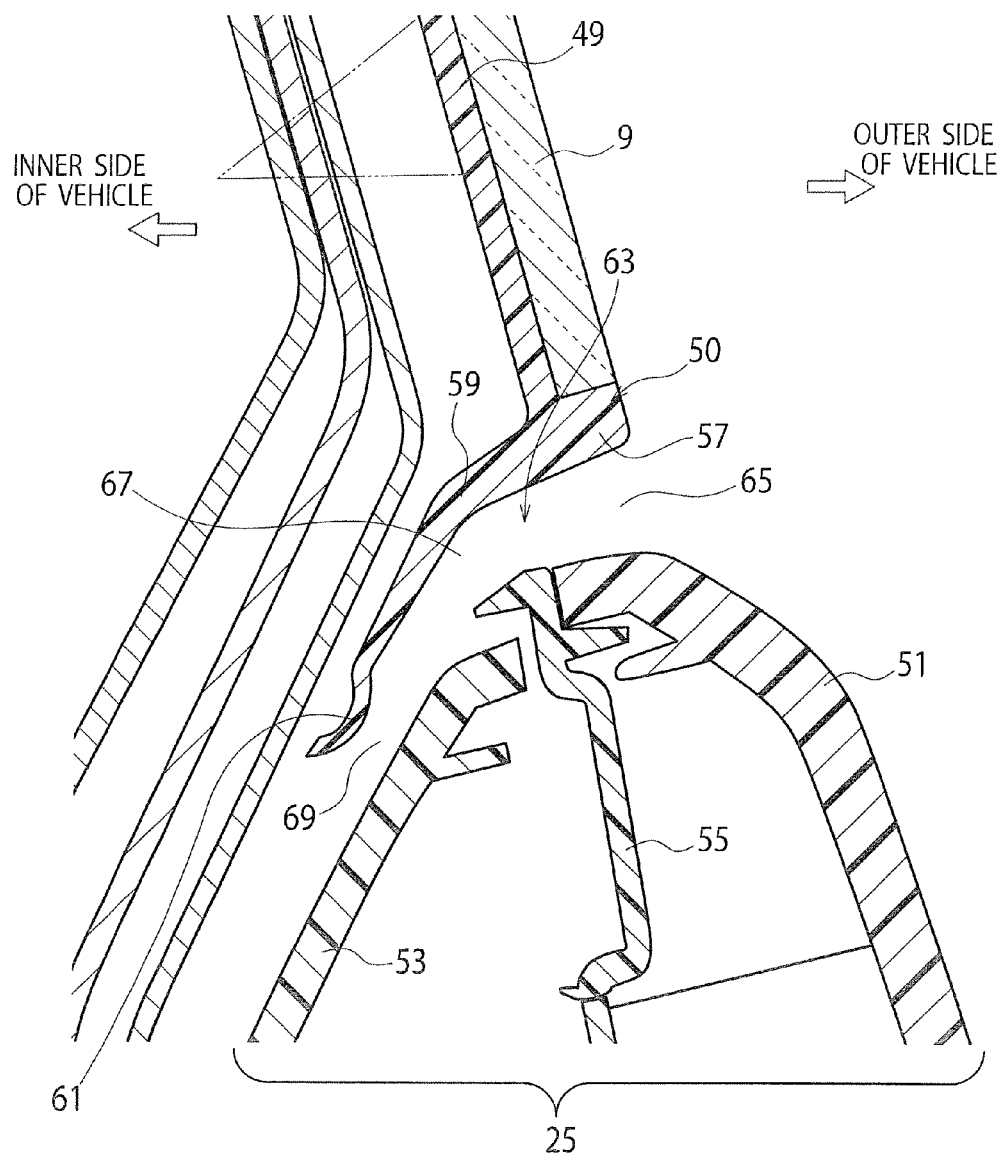
FIG. 5 is an enlarged cross-sectional view of a main section in FIG. 4.

In addition, as shown in FIGS. 4 and 5, in an area from the point Q to the point R in FIG. 1, the mount body 25 forming the door mirror mount 19 includes: an outer member 51 disposed on the outer side of the vehicle; an inner member 53 disposed on the inner side of the vehicle; and a middle member 55 disposed between the outer member 51 and the inner member 53. Moreover, the lip 50 formed integrally in the peripheral member 11 extends substantially straight from a root portion 57 disposed in an end portion of the lip 50 on the outer side of the vehicle to a bent portion 59 and then bends at the bent portion 59 toward the outer periphery of the peripheral member 11 (downward) and extends therefrom straight to a projecting portion 61 at a tip portion of the lip 50. In addition, the lip 50 is formed such that its thickness decreases as it gets closer from the root portion 57 through the bent portion 59 to the projecting portion 61, that is, as at gets closer to the inner side in the vehicle width direction. Note that the projecting portion 61 disposed at the tip portion is formed in an arc shape in cross section and projects outward toward the inner member 53 of the mount body 25.

As a result, the lip 50 and the mount body 25 define a predetermined gap 63 therebetween in a state where the front door 13 is closed. Specifically, the root portion 57 of the lip 50 and the outer member 51 of the mount body 25 define an inlet portion 65 of the gap 63. The lip 50 around the bent portion 59 and the middle member 55 define a middle portion 67 of the gap 63. The projecting portion 61 of the lip 50 and the inner member 53 define an outlet portion 69. In addition, the gap 63 is formed such that its cross-sectional width is largest at the inlet portion 65, decreases gradually as it gets closer to the middle portion 67, and is smallest at the outlet portion 69. In other words, the lip 50 and the mount body 25 facing the lip 50 are formed such that the distance therebetween is largest at the outer end in the vehicle width direction and smallest at the inner end in the vehicle width direction.

Now, Bernoulli's principle will be described briefly.

In general, when a fluid flows, the sum of potential energy by the height from a reference plane, kinetic energy by the speed, and pressure energy remains constant. In a case of traveling wind in this embodiment, changes in the potential energy are negligible, and therefore the sum of the kinetic energy (dynamic pressure) and the pressure energy (static pressure) of the traveling wind is constant. Accordingly, $(\frac{1}{2})\cdot\rho\cdot v^2 + p$ = (constant), where v is the flow speed of the traveling wind in its flow direction, $\rho$ is the density, and p is the pressure.

Figure 6:
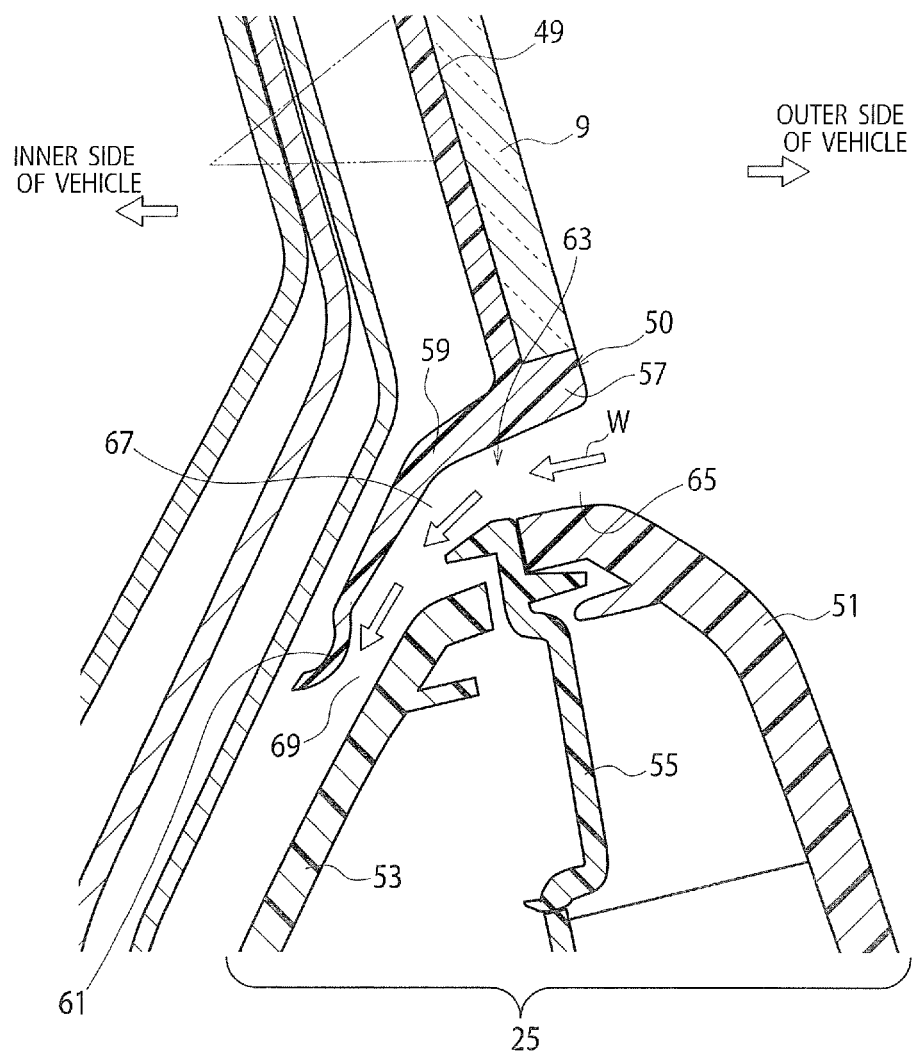
FIG. 6 is a cross-sectional view showing a state where traveling wind flows into a gap between a lip and a mount body of a door mirror mount.

In this embodiment, as shown in FIG. 6, as traveling wind W that occurs when the vehicle travels enters the gap 63, it enters the gap 63 from the inlet portion 65 to the middle portion 67. The traveling wind W then slightly changes its flow at the middle portion 67 toward the outer periphery of the lip 50 and thereafter flows to the outlet portion 69. Here, the outlet portion 69 is where the cross-sectional width of the gap 63 is smallest, in other words, a stagnation point. Thus, the flow of the traveling wind W substantially stops, and the kinetic energy (dynamic pressure) becomes substantially zero. For this reason, at the outlet portion 69 of the gap 63, almost all the energy of the traveling wind W, which is a fluid, is the pressure energy (static energy). Accordingly, the projecting portion 61 functions as a noise reduction wall, making it possible to significantly reduce the wind noise by the traveling wind W.

Figure 7:
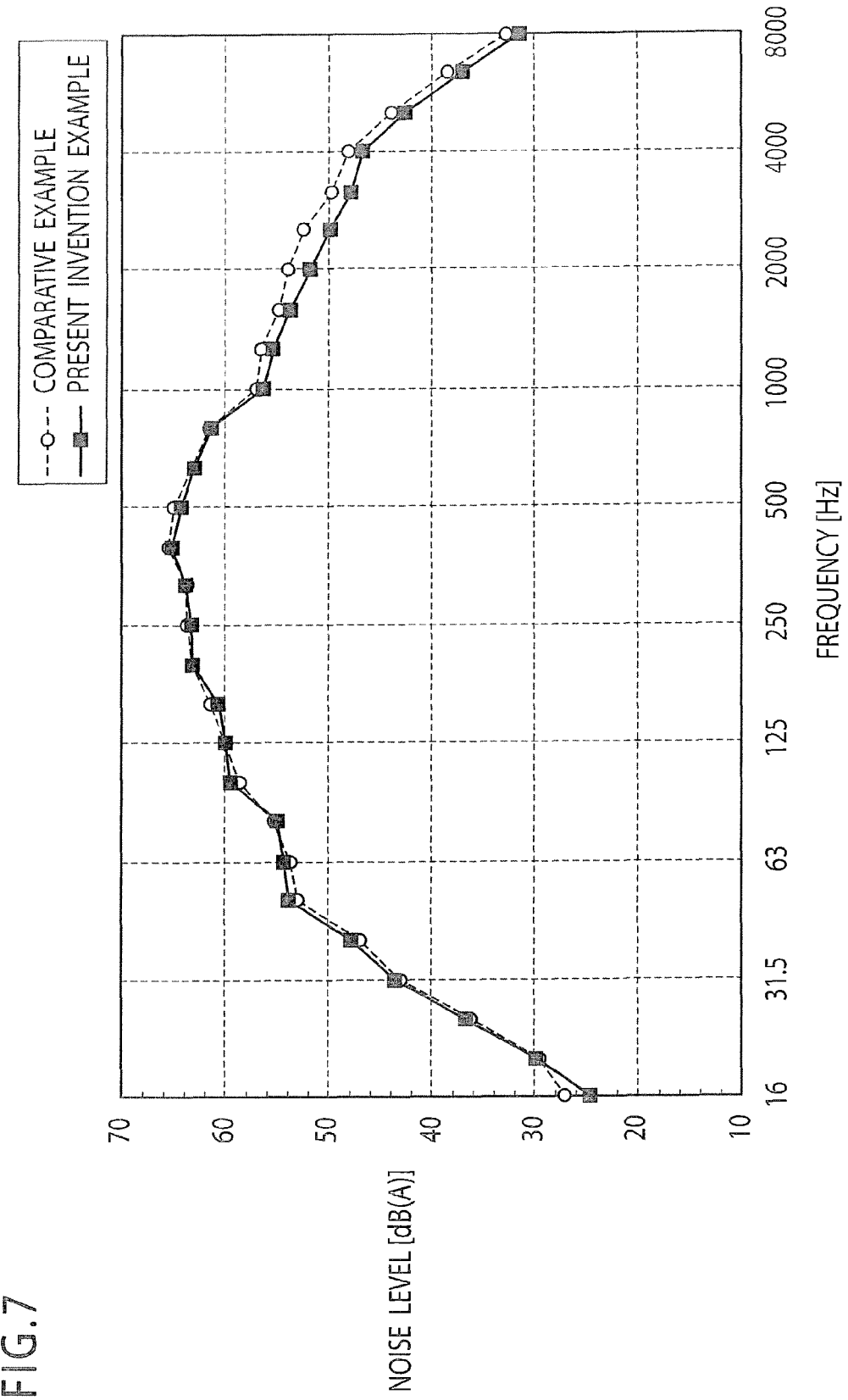
FIG. 7 is a graph comparing the noise level in terms of frequency between a present invention example with the lip according to the embodiment being provided and a comparative example without the lip being provided.

Meanwhile, from a comparison between a present invention example with the above-described lip 50 being provided and a comparative example without the lip 50 being provided, it was found that the noise level was lower for the present invention example in a range above a frequency of 1000 Hz, as shown in FIG. 7. Further, from a comparison between the present invention example and the comparative example in terms of articulation index (AI value) during travel of the vehicle, it was found that the present invention example was improved over the comparative example by approximately 3.

Note that while the contact rubber 47 is used in this embodiment, only adhesive may be used instead of the contact rubber 47 to bond the flange portion 35 of the front pillar 3 and the flange portion 45 of the holding member 41.

Hereinbelow, operations and effects of this embodiment will be described.

(1) In the vehicle window section structure according to this embodiment, the lip 50 and the mount body 25 of the door mirror mount 19 disposed facing the lip 50 are formed such that the distance therebetween is larger toward the outer end in the vehicle width direction and smaller toward the inner end in the vehicle width direction. Thus, as the traveling wind W that occurs when the vehicle travels enters the gap 63 between the lip 50 and the mount body 25, the flow speed of the traveling wind W decreases gradually and becomes smallest at the outlet portion 69 of the gap 63 and the pressure of the traveling wind W becomes largest there, due to Bernoulli's principle described above. Accordingly, the wind noise by the traveling wind W can be reduced efficiently.

(2) The projecting portion 61 projecting toward the mount body 25 of the door mirror mount 19 is provided at the inner end, in the vehicle width direction, of the lip 50. Accordingly, it is possible to minimize the cross-sectional width of the outlet portion 69 of the gap 63 by means of a simple structure and to improve the rigidity of the lip 50 as well. Incidentally, since the lip 50 is disposed at an outer side, in the vehicle width direction, of the holding member 41, the holding member 41 is hidden when one sees the gap 63 from the outer side of the vehicle. Accordingly, the external appearance is improved.

(3) The lip 50 is formed such that its thickness decreases as it gets closer to the inner side in the vehicle width direction. Accordingly, it is possible to reduce the weight of the lip 50 as a whole.

(4) The peripheral member 11 is provided along the outer periphery of the small window 9, the small window 9 is mounted to the vehicle body side through the peripheral member 11, and the lip 50 is formed integrally with the peripheral member 11. Accordingly, it is possible to improve the holding stiffness of the lip 50 and to eliminate man-hours in mounting the lip 50 in a separate step.

INDUSTRIAL APPLICABILITY

According to the present invention, as traveling wind that occurs when the vehicle travels enters the gap between the lip and the door mirror mount, the flow speed of the traveling wind gradually decreases and the pressure thereof increases. Accordingly, it is possible to efficiently reduce the wind noise by the traveling wind.

The invention claimed is:
1. A vehicle window section structure comprising:
a small window disposed on a vehicle body side;
a lip disposed on an outer periphery of the small window and extending inward in a vehicle width direction; and
a door mirror mount disposed on an openable and closable door and disposed facing the lip in a state where the door is closed, wherein the lip is separated from the door mirror mount from an outer end of the lip, in the vehicle width direction, to an inner end of the lip, in the vehicle width direction, and wherein a distance between the lip and the door mirror mount is smaller at the inner end in the vehicle width direction than at the outer end in the vehicle width direction.

2. The vehicle window section structure according to claim 1, wherein the lip includes a projecting portion projecting toward the door mirror mount at the inner end of the lip.

3. The vehicle window section structure according to claim 1, wherein the lip is formed such that a thickness thereof decreases in a direction from the outer end of the lip to the inner end of the lip.

4. The vehicle window section structure according to claim 1, wherein a peripheral member is disposed along the outer periphery of the small window, the small window is mounted to the vehicle body side through the peripheral member, and the lip is a part of the peripheral member.

* * * * *